(12) United States Patent
Sun et al.

(10) Patent No.: US 8,081,696 B2
(45) Date of Patent: Dec. 20, 2011

(54) METHOD AND APPARATUS FOR MULTI-CARRIER HSDPA TRAFFIC TRANSMISSION CHANNEL CODING

(75) Inventors: Shaohui Sun, Shanghai (CN); Yingmin Wang, Shanghai (CN); Guiliang Yang, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 824 days.

(21) Appl. No.: 11/994,721

(22) PCT Filed: Jun. 30, 2006

(86) PCT No.: PCT/CN2006/001523
§ 371 (c)(1),
(2), (4) Date: Jun. 6, 2008

(87) PCT Pub. No.: WO2007/003127
PCT Pub. Date: Jan. 11, 2007

(65) Prior Publication Data
US 2008/0317152 A1 Dec. 25, 2008

(30) Foreign Application Priority Data
Jul. 5, 2005 (CN) .......................... 2005 1 0080773

(51) Int. Cl.
*H04L 5/12* (2006.01)
(52) U.S. Cl. ...................................................... 375/261
(58) Field of Classification Search .......... 375/260–261, 375/267, 285, 295, 298–299, 358; 455/101, 455/103; 714/748, 750, 780
See application file for complete search history.

(56) References Cited

U.S. PATENT DOCUMENTS

| | | | |
|---|---|---|---|
| 6,421,333 B1 | 7/2002 | Jalali | |
| 6,807,234 B2 | 10/2004 | Hansen | |
| 7,249,303 B2 * | 7/2007 | Dottling et al. | 714/748 |
| 7,392,460 B2 * | 6/2008 | Kim et al. | 714/781 |

(Continued)

FOREIGN PATENT DOCUMENTS

CN 1213472 4/1999

(Continued)

OTHER PUBLICATIONS

International Search Report issued Nov. 9, 2006 for PCT/CN2006/001523 (3 pgs).

(Continued)

*Primary Examiner* — Khanh C Tran
(74) *Attorney, Agent, or Firm* — Fulbright & Jaworski L.L.P.

(57) ABSTRACT

Three channel coding schemes for multi-carrier HSDPA packet data transmission are disclosed. The first scheme includes: dividing data into N groups (S210); performing CRC attachment, code block segmentation, channel coding and rate matching on each group of data respectively (S220); scrambling and interleaving the N groups of data unitedly, and then dividing the data into N groups again to perform QAM constellation rearrangement and then map to physical channels of respective carriers for transmission. The second scheme includes: dividing data to be sent into groups (S510); and sending each group of data via a physical channel of a carrier after coding it according to single-carrier HSDPA (S520). The third scheme includes: sending N carrier channels as a whole to a physical layer to perform processing from CRC attachment to QAM constellation rearrangement (S710); dividing the processed data into groups and mapping them to respective carrier channels for transmission (S720).

8 Claims, 6 Drawing Sheets

U.S. PATENT DOCUMENTS

| | | | |
|---|---|---|---|
| 7,400,607 B2 * | 7/2008 | Kim et al. ................ | 370/335 |
| 2003/0081692 A1 | 5/2003 | Kwan et al. | |
| 2004/0014447 A1 | 1/2004 | Hepler et al. | |
| 2004/0187069 A1 | 9/2004 | Pietraski et al. | |
| 2005/0053168 A1 * | 3/2005 | Song et al. ................ | 375/261 |
| 2005/0128993 A1 * | 6/2005 | Yu et al. .................. | 370/342 |
| 2005/0157803 A1 * | 7/2005 | Kim et al. ................ | 375/260 |
| 2005/0176435 A1 * | 8/2005 | Fauconnier et al. ...... | 455/450 |
| 2007/0061690 A1 * | 3/2007 | Stewart et al. ........... | 714/800 |

FOREIGN PATENT DOCUMENTS

| | | |
|---|---|---|
| JP | 07-183862 | 7/1995 |
| WO | WO-03/090011 | 10/2003 |
| WO | WO-2004/062113 | 7/2004 |
| WO | WO-2004/102863 | 11/2004 |
| WO | WO-2005/020489 | 3/2005 |
| WO | WO-2005/046062 | 5/2005 |

OTHER PUBLICATIONS

Office Action issued for Chinese Application No. 2005100807736, dated Feb. 27, 2009, 6 pages.

3rd Generation Partnership Project; Technical Specification Group Radio Access Network; Channel coding and multiplexing examples, Release 4, TR 25.944, v4.1.0; Jun. 2001, 80 pages.

3rd Generation Partnership Project; Technical Specification Group Radio Access Network; Multiplexing and channel coding (FDD), Release 6, TS 25. 212, v6.5.0; Jun. 2005; 77 pages.

Sankar H., et al., "Design of Low-density parity-check (LDPC) codes for high order constellations", Global Telecommunications Conference, Dallas, Texas, Dec. 2004, vol. 5, pp. 3113-3117.

The Extended European Search Report issued for 06761334.9-2415, dated Apr. 8, 2010, 15 pages.

Office Action issued for Chinese Patent Application No. 2005100807736, dated Sep. 25, 2009, 5 pages.

Glossner, J., et al., "A Software Defined Communications Baseband Design", IEE Communications Magazine, 2003, 10 pages.

Daneshrad, B., et al., "Performance and implementation of clustered-OFDM for wireless communications", Mobile networks and Applications, 1997, pp. 305-314.

Office Action issued for South Korean Patent Application No. 10-2008-7002676, dated Oct. 26, 2009, 4 pages.

"Universal Mobile Telecommunications System (UMTS); Channel coding and multiplexing examples," 3GPP TR 25.944, version 4.1.1. Release 4, Jun. 1, 2001, 83 pages.

Nortel Networks, "Reference OFDM Physical Layer Configuration," 3GPP TSG-RAN-1 Meeting #28 bis R1-02-1222, Oct. 9, 2002, 13 pages.

France Telecom et al., "Common Link-Level Simulation Assumptions for the OFDM Study Item," 3GPP TSG-RAN-1 meeting #35 R1-031296, Nov. 21, 2003, 16 pages.

Office Action issued for Japanese Patent Application No. 2008-518601, dated Aug. 10, 2010, 7 pages (with English language translation).

* cited by examiner

METHOD AND APPARATUS FOR MULTI-CARRIER HSDPA TRAFFIC TRANSMISSION CHANNEL CODING

FIELD OF THE INVENTION

The present invention relates to the field of communication, in particular, to high-speed downlink packet access (HSDPA) technology, and specifically, to a method and an apparatus for multi-carrier HSDPA traffic transmission channel coding.

BACKGROUND OF THE INVENTION

The capability to support high-speed mobile packet data traffic is one of the most important characteristics of the 3G system. 3GPP R99 may provide a data rate with a peak rate of 2 Mbps. Such a rate can meet the requirements of most of the existing packet data traffic transmission. However, for many data services with strict requirements on traffic load and delay, such as video, streaming media and downloading, the system is required to provide higher transmission rate and shorter time delay.

Therefore, HSDPA technology is a technology introduced into R5 by 3GPP HSDPA not only can support high-speed asymmetrical data service, but also can greatly increase the network capacity and minimize the input cost of operators at the same time. It provides a way to smoothly evolve into higher data transmission rate and higher capacity for a Universal Mobile Telecommunications System (UMTS). In HSDPA technology of 3GPP R5, full reference is made to the design philosophy and experience of CDMA20001X EV-DO, and a high-speed downlink shared channel (HS-DSCH) is newly added. With the HS-DSCH, resources may be uniformly utilized, and may be dynamically allocated according to the actual situation of users. Accordingly, the resources efficiency may be improved.

In the existing single-carrier HSDPA, when a packet data is transmitted, the network side sends control information to a user equipment via an HS-SCCH channel (downlink control channel) in advance. The control information is used by the user equipment to receive data sent by the network side via an HS-DSCH channel, including information about data blocks sent to the user equipment on the HS-DSCH channel, information about time slots employed, modulation mode, data block size, redundancy version number and retransmission version etc. Then, the network side performs traffic channel (HS-DSCH) coding on the data to be sent and then sends the data. The user equipment obtains the control information from the HS-SCCH channel, and then decodes the data received from the HS-DSCH channel using the control information.

Figure 1:
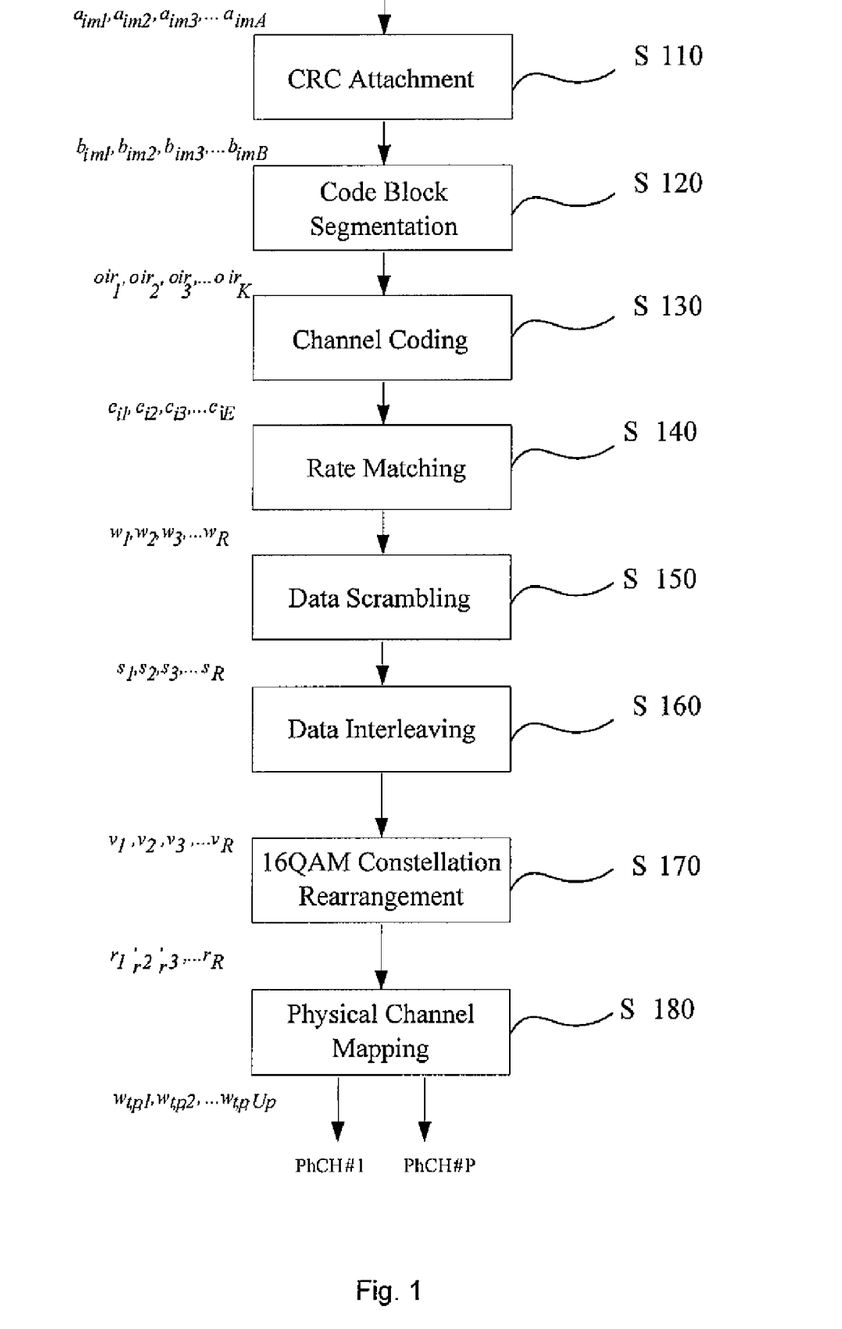
FIG. 1 is a flow chart of a method for single-carrier HSDPA traffic channel coding in the prior art.

Referring to FIG. 1, it is a flow chart of a method for single-carrier HSDPA traffic channel coding in the prior art, which includes the following steps:

S110 (CRC Attachment): A CRC check bit is attached to a data block to be sent, by means of which a user equipment may check whether an error occurs in the received data;

S120 (Code Block Segmentation): The data block is segmented according to its length, which is a pre-processing of the subsequent channel coding;

130 (Channel coding): Channel coding is performed on the segmented data block, so that the receiving end may correct most of the errors during transmission according to the channel coding;

140 (Rate Matching): Rate matching is performed twice on the coded data, so that HARQ transmission may be carried out;

S150 (Data Scrambling): The data subjected to the matching processing is scrambled, so that the data to be sent will be further randomized, thereby the transmission performance will be improved and mutual interference will be reduced;

S160 (Data Interleaving): The scrambled data is interleaved, and the interleaved data is sent in different time slots, thereby time diversity gain will be obtained and the robust capability will be improved;

S170 (16QAM Constellation Rearrangement): When the modulation mode of the data transmission is 16 QAM mode, if retransmission occurs, the high and low bits of the constellation point for the retransmitted data need to be exchanged, thus the performance of high bit data and low bit data in the constellation point may be balanced.

S180 (Physical Channel Mapping): The data to be sent are adapted to different physical channels for transmission.

To further improve the performance of the system, the applicant proposes a solution to enhance the packet data traffic transmission capability via multi-carrier HSDPA technology. However, in the current 3GPP TDD R5 specification, only employing HSDPA single-carrier transmission mode for the method for multi-carrier HSDPA traffic transmission channel coding cannot meet multi-carrier HSDPA data transmission.

SUMMARY OF THE INVENTION

An object of the present invention is to provide a method and an apparatus for multi-carrier HSDPA traffic transmission channel coding for downlink packet data transmission, thereby the technical problems in the prior art may be solved that single-carrier HSDPA only considers the traffic transmission channel coding of a single carrier so that multi-carrier HSDPA control requirement cannot be met.

To solve the above problems, the invention discloses a method for multi-carrier HSDPA traffic transmission channel coding, which comprises the following steps:

A: dividing, by network side, data to be sent on an HS-DSCH channel into N groups, wherein N is equal to the number of carriers for packet data transmission;

B: performing CRC attachment, code block segmentation, channel coding and rate matching on each group of data;

C: forming a new data stream from the N groups of data processed in step B during data scrambling, and interleaving the data stream; and D: dividing the interleaved data into N groups again, and mapping each group of data to a physical channel of a carrier respectively for sending, after performing QAM constellation rearrangement, wherein N is equal to the number of carriers which have been used for packet data transmission of a user terminal.

When the user equipment reports a channel condition of each carrier to the network side, a channel quality indication is generated, which includes a transmission block size of a physical channel of each carrier suggested by the user equipment; and the network side divides the data to be sent according to the transmission block size of the physical channel of each carrier.

The invention further provides an apparatus for multi-carrier HSDPA traffic transmission channel coding, which comprises: a data stream dividing unit, at least N CRC attachment units, at least N code block segmentation units, at least N channel coding units, at least N rate matching units, a scrambling unit, an interleaving unit, at least N QAM constellation rearrangement units and at least N physical layer mapping units, wherein N is equal to the number of carriers for packet data transmission, and wherein:

the data stream dividing unit is adapted to divide data to be sent on an HS-DSCH channel into N groups and send each group of data to a CRC attachment unit respectively;

the CRC attachment units are adapted to attach a CRC check bit to a data block to be sent;

the code block segmentation units are connected with the CRC attachment units, and adapted to segment the data block according to its length;

the channel coding units are connected with the code block segmentation units, and adapted to perform channel coding on the segmented data block;

the rate matching units are connected with the channel coding units, and adapted to perform rate matching twice on the coded data, so as to carry out HARQ transmission;

the data scrambling unit is connected with the N rate matching units, and adapted to form a new data stream from the N groups of data during data scrambling;

the data interleaving unit is adapted to interleave the scrambled data and divide the interleaved data into N groups again, wherein each group of data is sent to a QAM constellation rearrangement unit;

the QAM constellation rearrangement units are adapted to exchange high and low bits of a constellation point for retransmitted data; and the physical channel mapping units are adapted to map the data to be sent to a physical channel of a carrier for sending.

The invention provides a method for multi-carrier HSDPA traffic transmission channel coding, which comprises the following steps:

A: dividing, by network side, data to be sent on an HS-DSCH channel into N groups, wherein N is equal to the number of carriers which have been used for packet data transmission of a user equipment; and B: sending each group of data via a physical channel of each carrier after performing traffic channel coding respectively.

The traffic channel coding comprises: mapping each group of data to a physical channel of a carrier for sending, after performing CRC attachment, code block segmentation, channel coding, rate matching, scrambling, interleaving and QAM constellation rearrangement.

When the user equipment reports a channel condition of each carrier to the network side, it reports a generated channel quality indication to the network side, wherein the channel quality indication includes a transmission block size of a physical channel of each carrier suggested by the user equipment;

The network side divides the data to be sent according to the transmission block size of the physical channel of each carrier.

The invention provides an apparatus for multi-carrier HSDPA traffic transmission channel coding, which comprises: a data stream dividing unit and N channel coders, wherein N is equal to the number of carriers for packet data transmission, and wherein:

the data stream dividing unit is adapted to divide the data to be sent on an HS-DSCH channel into N groups, wherein each group of data is sent to a channel coder;

the channel coders are adapted to send each group of data via a physical channel of each carrier after performing traffic channel coding.

The channel coder comprises:

a CRC attachment unit, adapted to attach a CRC check bit to a data block to be sent;

a code block segmentation unit, connected with the CRC attachment unit, and adapted to segment the data block according to its length;

a channel coding unit, connected with the code block segmentation unit, and adapted to perform channel coding on the segmented data block;

a rate matching unit, connected with the channel coding unit, and adapted to perform rate matching twice on the coded data, so as to carry out HARQ transmission;

a data scrambling unit, connected with the rate matching unit, and adapted to scramble the data;

a data interleaving unit, adapted to interleave the scrambled data and send the interleaved data to a QAM constellation rearrangement unit;

a QAM constellation rearrangement unit, adapted to exchange high and low bits of a constellation point for retransmitted data; and a physical channel mapping unit, adapted to map the data to be sent to a physical channel of a carrier for sending.

The invention provides a method for multi-carrier HSDPA traffic transmission channel coding, which comprises the following steps:

A: performing, by network side, CRC attachment, code block segmentation, channel coding, rate matching, data scrambling, data interleaving and QAM constellation rearrangement on data to be sent on an HS-DSCH channel; and B: dividing the data processed in step A into N groups, and sending each group of data after mapping it to a physical channel of a carrier respectively, wherein N is equal to the number of carriers which have been used for packet data transmission of a user equipment.

In step B, a transmission data block size of the physical channel of the carrier is determined according to a physical channel resource of each carrier.

The invention provides an apparatus for multi-carrier HSDPA traffic transmission channel coding, which comprises:

a CRC attachment unit, a code block segmentation unit, a channel coding unit, a rate matching unit, a scrambling unit, an interleaving unit, a QAM constellation rearrangement unit and N physical layer mapping units, wherein N is equal to the number of carriers for packet data transmission, and wherein:

the CRC attachment unit is adapted to attach a CRC check bit to a data block to be sent;

the code block segmentation unit is connected with the CRC attachment unit, and adapted to segment the data block according to its length;

the channel coding unit is connected with the code block segmentation unit, and adapted to perform channel coding on the segmented data block;

the rate matching unit is connected with the channel coding unit, and adapted to perform rate matching twice on the coded data, so as to carry out HARQ transmission;

the data scrambling unit is connected with the rate matching unit, and adapted to scramble the data;

the data interleaving unit is adapted to interleave the scrambled data and send the interleaved data to a QAM constellation rearrangement unit;

the QAM constellation rearrangement unit is adapted to exchange high and low bits of a constellation point for retransmitted data, and divide the data subjected to QAM constellation rearrangement into N groups, wherein each group of data is sent to a physical channel mapping unit; and the physical channel mapping units are adapted to map the data to be sent to a physical channel of a carrier for sending.

In the first channel coding scheme according to the invention, data are firstly divided into N groups, CRC attachment, code block segmentation, channel coding and rate matching are performed on each group of data respectively, and after the N groups of data subjected to the matching processing are scrambled and interleaved unitedly, the data are divided into N groups again, subjected to QAM constellation rearrangement respectively, and then mapped to physical channels of respective carriers for transmission. In this coding scheme, the interleaving effect is very high, and the burst error correction capability of a user equipment during data transmission may be improved to the maximum extent.

In the second channel coding scheme according to the invention, the data to be sent on an HS-DSCH channel are divided into several groups, and each group of data may be sent via a physical channel of a carrier after being coded according to single-carrier HSDPA. In this coding scheme, each group of data may be processed on each carrier independently and will not be combined. In other words, the data on each carrier are transmitted as independent data, and each group of data may be regarded as irrelevant during transmission. This scheme is very simple and practical.

In the third channel coding scheme according to the invention, N carrier channels are sent, as a whole, to a physical layer for performing processing from CRC attachment to QAM constellation rearrangement, and then the data subjected to QAM constellation rearrangement is divided into groups and mapped to respective carrier channels for transmission. The process for channel coding in this scheme is simple and easy to implement for the network side.

DETAILED DESCRIPTION OF THE EMBODIMENTS

The invention will now be illustrated in detail in conjunction with the drawings.

The invention provides a method for multi-carrier HSDPA traffic transmission channel coding and a corresponding apparatus. By the coding scheme of the invention, multi-carrier HSDPA packet data transmission may be realized, thereby the peak transmission rate and frequency utilization of the system may be improved. The invention discloses three methods for multi-carrier HSDPA traffic transmission channel coding and the corresponding apparatuses according to the embodiments of the invention.

Method 1

Figure 2:
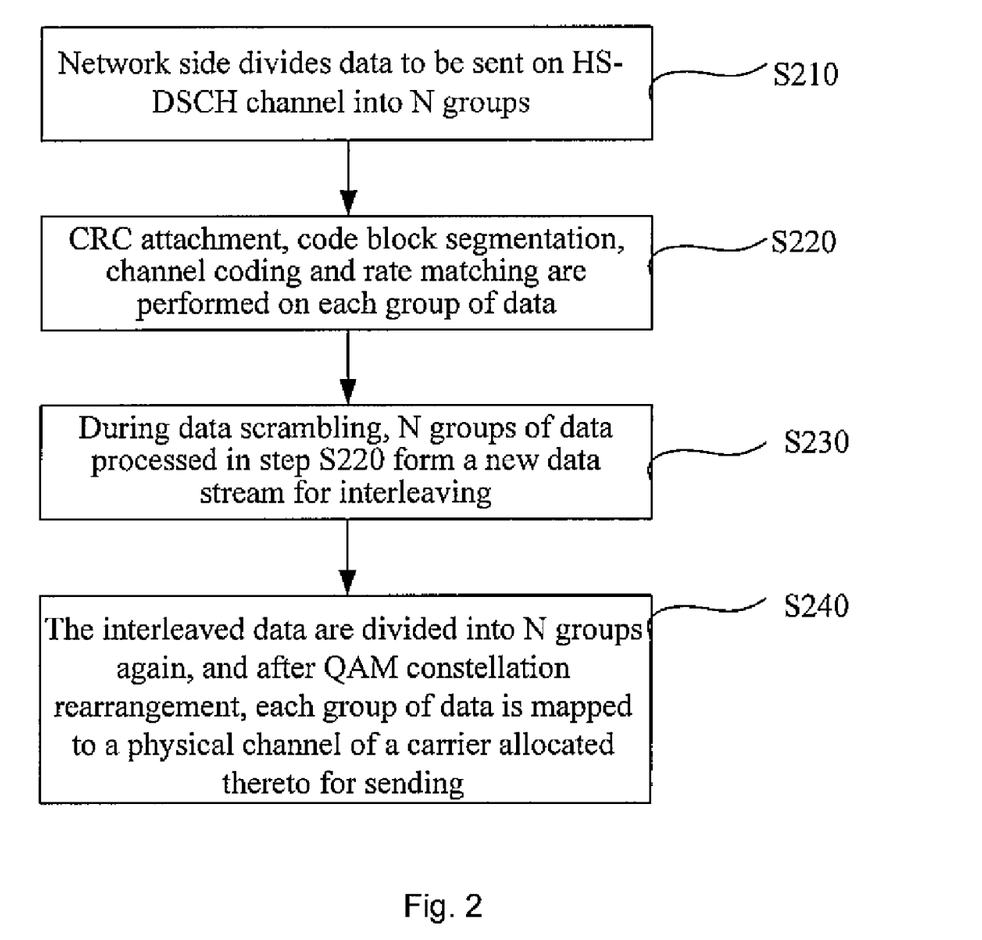
FIG. 2 is a flow chart of the first method for multi-carrier HSDPA traffic transmission channel coding according to an embodiment of the invention.

Referring to FIG. 2, it is a flow chart of the first method for multi-carrier HSDPA traffic transmission channel coding according to the invention.

S210: Network side divides data to be sent on an HS-DSCH channel into N groups, wherein N is equal to the number of carriers for packet data transmission.

Generally, a user equipment measures a channel condition thereof and reports the measuring result to the network side. The network side allocates a channel resource, which comprises an HS-DSCH channel resource, to the user equipment according to the result reported by the user equipment. The HS-DSCH channel resource allocated to a user equipment may be distributed on a plurality of carriers.

It is assumed that the HS-DSCH channel resource allocated to user A by the network side comprises carrier 1 resource, carrier 2 resource and carrier 3 resource. Then, the network side may divide the data to be sent into three parts averagely in terms of data amount, wherein each part of the data corresponds to a carrier, and the data to be sent is sent to user A via respective carriers. The network side may also determine the amount of data to be sent on each carrier according to the channel condition reported by user A. It is assumed that the channel condition reported by user A is as follows: the channel condition of carrier 1 is the best, the channel condition of carrier 2 is the next best, and the channel condition of carrier 3 is the worst. The network side may pre-allocate the data to be sent to carrier 1. After the resources for the HS-DSCH channel in carrier 1 are allocated, the remaining data will be allocated to carrier 2, and after the resources for the HS-DSCH channel in carrier 2 are allocated, the finally remaining data to be sent will be allocated to the resources for the HS-DSCH channel in carrier 3, thereby the data amount sent on each carrier will be determined. The channel condition may consider the number of HS-DSCH channel resources in the carrier. However, the channel condition generally considers the magnitude of HS-DSCH channel interference in the carrier. The smaller the interference is, the better the channel condition of the carrier will be.

As a matter of course, because a channel quality indication is generally generated when a user equipment (UE) reports the physical channel condition of each carrier, which comprises the transmission block size of a physical channel of each carrier suggested by the UE, to the network side. The network side may divide the data to be sent according to the suggested transmission block size of the physical channel of each carrier.

The data to be sent are divided into N groups, wherein each group of data may correspond to a physical channel of a carrier. The identifier of a respective channel may be added to each group of data for the subsequent processing.

S220: CRC attachment, code block segmentation, channel coding and rate matching (physical layer hybrid-ARQ) are performed on each group of data.

The physical layer will perform CRC attachment, code block segmentation, channel coding and rate matching on each group of data. For the physical layer, according to the specific hardware condition of the network side, CRC attachment, code block segmentation, channel coding and rate matching may be performed on each group of data simultaneously, or CRC attachment, code block segmentation, channel coding and rate matching may be performed respectively according to the precedence order of each group of data.

In the CRC attachment, a CRC check bit is attached to a data block to be sent, by means of which the receiving end may check whether error occurs in received data. In the code block segmentation, the data block is segmented according to its length, which is a pre-processing of the subsequent channel coding. In the channel coding, channel coding is performed on the segmented data block, so that the receiving end may correct most of the errors during transmission according to the channel coding. In the rate matching, rate matching is performed twice on the coded data, so as to carry out HARQ transmission. In brief, the main function of hybrid automatic retransmission request in HSDPA is to accomplish the related operations of HARQ in the physical layer. This process is accomplished via two-step rate matching according to the factor such as HARQ type increment redundancy, etc.

S230: During data scrambling (bit scrambling), the N groups of data processed in step S220 form a new data stream for interleaving.

During data scrambling, the N groups of data processed in step S220 form a new data stream for interleaving. In the data scrambling, the data subjected to the matching processing is scrambled, so that the data to be sent will be further randomized, thereby the transmission performance will be improved and mutual interference will be reduced. The function of the interleaving is to overcome burst error. In this embodiment, a new data stream is formed from the N groups of data, and then the new data stream is scrambled and interleaved, thereby improving the effect of the interleaving processing. Apparently, for the case that each group of data is scrambled and interleaved respectively and the case that a new data is formed from the N groups of data and then scrambled and interleaved, the interleaving effect of the latter is better. Based on the above, in this embodiment, a data stream is formed from the data on all the carriers for interleaving.

S240: The interleaved data is divided into N groups again, and after QAM constellation rearrangement, each group of data is mapped to a physical channel of a carrier allocated thereto for sending, wherein N is equal to the number of carriers which have been used for packet data transmission of the user equipment.

Because QAM modulation is employed, the reliabilities of different positions on a constellation are different. Better performance may be achieved by rearranging the constellation. The rearrangement may be realized by exchanging the information on different bit positions. The rearrangement scheme is indicated via an HS-SCCH (downlink control channel). However, for QPSK modulation, this step is transparent.

The network side divides the interleaved data into N groups again according to the dividing manner employed in step S210.

Figure 3:
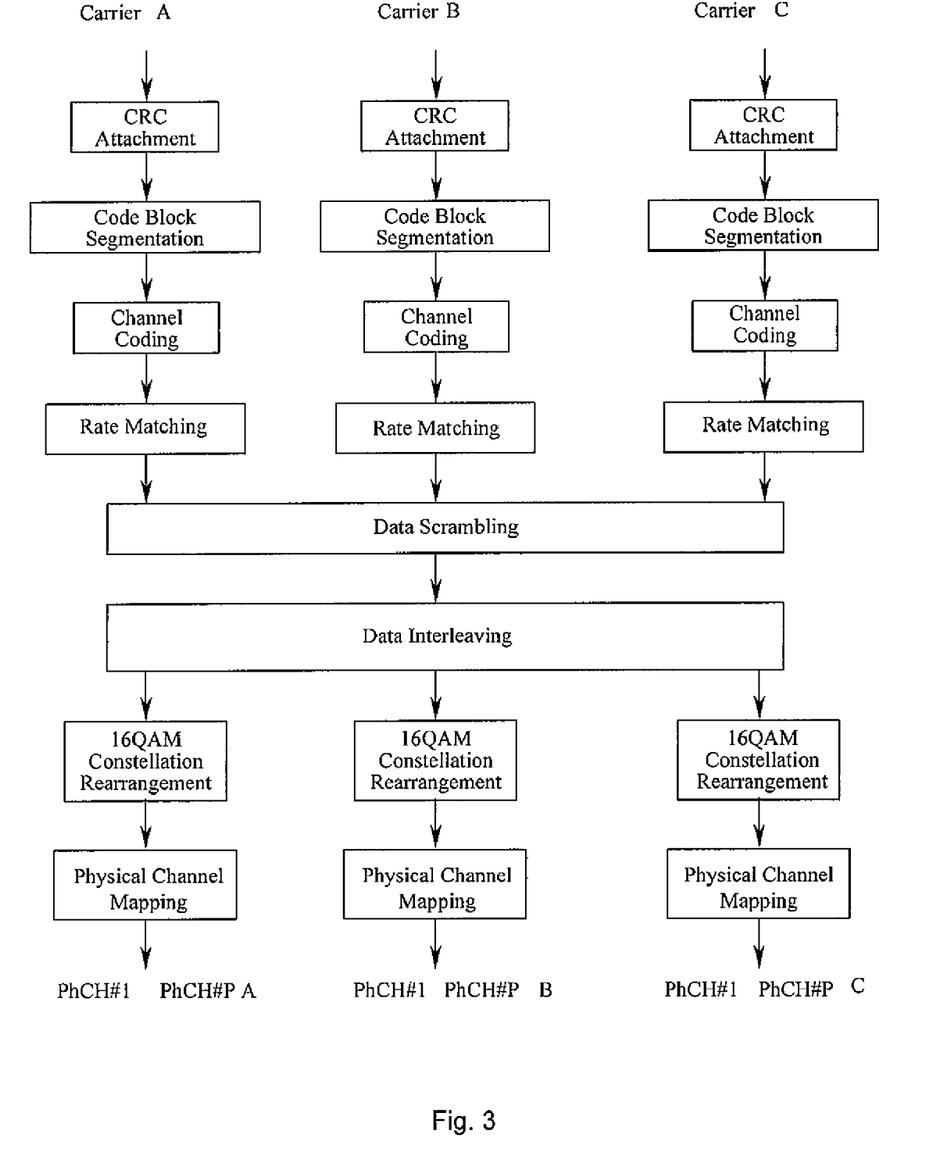
FIG. 3 shows an example of the method in FIG. 2 according to an embodiment of the invention.

For the convenience of illustration, it is assumed that the number of the employed carriers is 3, and each carrier is designated as carrier A, B or C respectively. The corresponding process for multi-carrier HSDPA traffic transmission channel coding is as follows (referring to FIG. 3). Firstly, according to a channel condition of each carrier, the data to be sent is divided into three groups in accordance with the number of the carriers at the MAC layer. After CRC attachment, code block segmentation, channel coding and rate matching are performed on the three groups of data respectively, the three groups of data are combined in a data scrambling module, then the processed data is input to an HS-DSCH Interleaving (data interleaving) module unitedly for interleaving. After being interleaved, the data is divided into three groups in accordance with the number of the carriers again, and then processed by a constellation rearrangement for QAM (QAM constellation rearrangement) module and a physical channel mapping module respectively. The processed data is transmitted on the three carriers respectively.

The invention provides the first apparatus for multi-carrier HSDPA traffic transmission channel coding, which comprises: a data stream dividing unit, at least N CRC attachment units, at least N code block segmentation units, at least N channel coding units, at least N rate matching units, a scrambling unit, an interleaving unit, at least N QAM constellation rearrangement units and at least N physical layer mapping units, wherein N is equal to the number of carriers for packet data transmission, and wherein:

the data stream dividing unit is adapted to divide data to be sent on an HS-DSCH channel into N groups and send each group of data to a CRC attachment unit respectively;

the CRC attachment units are adapted to attach a CRC check bit to a data block to be sent;

the code block segmentation units are connected with the CRC attachment units, and adapted to segment the data block according to its length;

the channel coding units are connected with the code block segmentation units, and adapted to perform channel coding on the segmented data block;

the rate matching units are connected with the channel coding units, and adapted to perform rate matching twice on the coded data, so as to carry out HARQ transmission;

the data scrambling unit is connected with the N rate matching units, and adapted to form a new data stream from the N groups of data during data scrambling;

the data interleaving unit is adapted to interleave the scrambled data and divide the interleaved data into N groups again, wherein each group of data is sent to a QAM constellation rearrangement unit;

the QAM constellation rearrangement units are adapted to exchange high and low bits of a constellation point for retransmitted data; and the physical channel mapping units are adapted to map the data to be sent to a physical channel of a carrier allocated thereto for sending.

Figure 4:
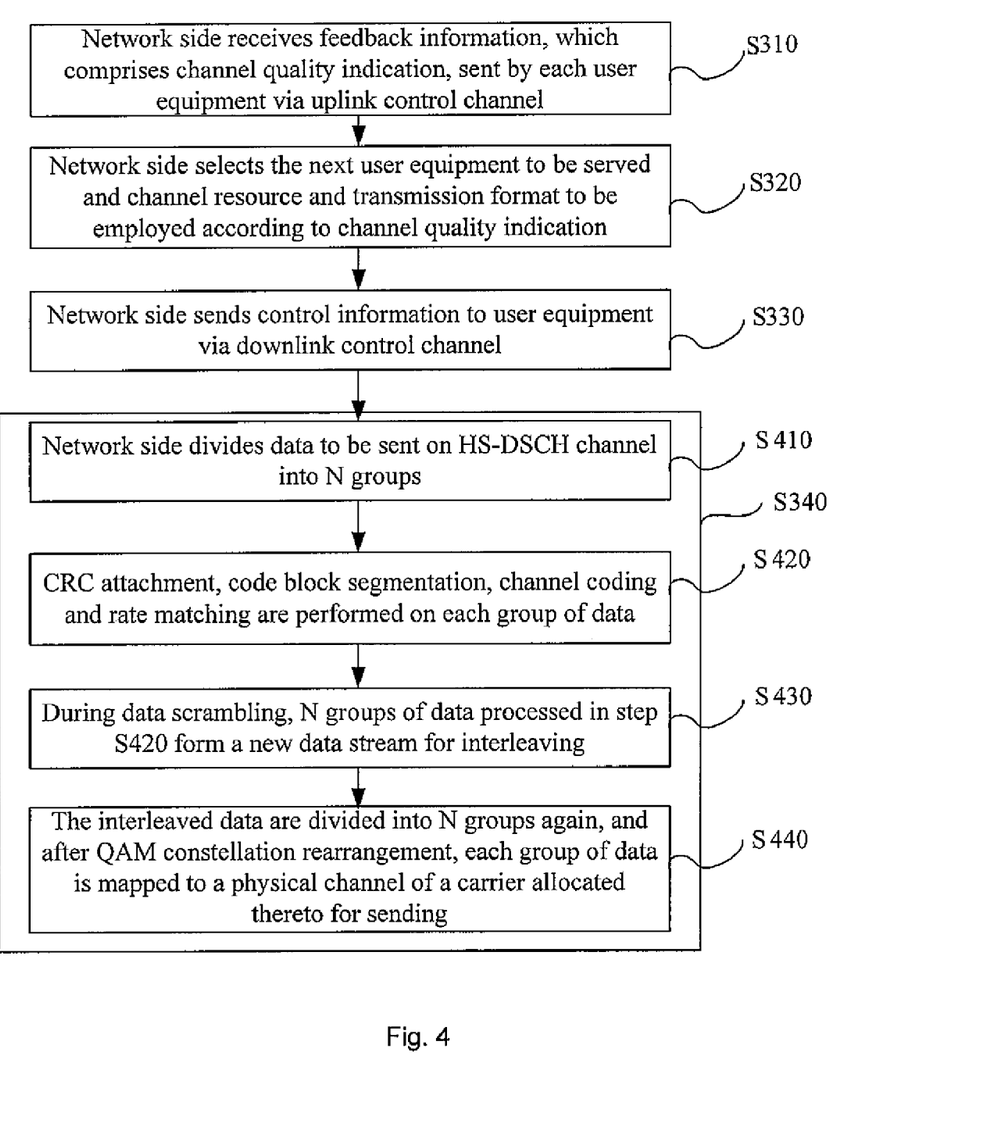
FIG. 4 is a flow chart of the first method for multi-carrier HSDPA packet data transmission according to an embodiment of the invention.

Referring to FIG. 4, it is a flow chart of the first method for multi-carrier HSDPA packet data transmission according to the invention, which comprises the following steps:

S310: The network side receives feedback information, which comprises a channel quality indication, sent by each user equipment via an uplink control channel.

At the beginning of the process of establishing packet data transmission between a user equipment and the network side, when the network side sends data to the user equipment for the first time, the network side sends control information via a downlink control channel in advance, and the user equipment receives the control information, and then receives data from an HS-DSCH channel. During the subsequent packet data transmission, the network side may send the next data according to feedback information of the user equipment via the uplink control channel. Generally, the user equipment may perform channel measurement and send the feedback information such as channel measuring result etc. to the network side via the uplink control channel. The channel quality indication comprises transmission data block size, modulation format and so on suggested by the user equipment.

S320: The network side selects the next user equipment to be served and the channel resource and transmission format to be employed according to the channel quality indication.

During each data transmission, the network side selects a user equipment or several user equipments to be served and determines the channel resource and transmission format to be employed in accordance with a scheduling algorithm, according to a sent data response message and user equipment channel quality indication fed back by each user equipment via the uplink control channel.

S330: The network side sends the control information to the user equipment via the downlink control channel, so that the user equipment may receive the data transmitted via the HS-DSCH channel according to the control information. The control information at least comprises a scheme for the network side to encode the data on the HS-DSCH channel.

S340: The network side sends the data to be sent via the HS-DSCH channel after channel coding. Specifically, this step comprises:

S410: The network side divides the data to be sent on an HS-DSCH channel into N groups, wherein N is equal to the number of carriers for packet data transmission;

S420: CRC attachment, code block segmentation, channel coding and rate matching are performed on each group of data;

S430. During data scrambling, the N groups of data processed in step S420 form a new data stream for interleaving;

S440: The interleaved data are divided into N groups again, and after QAM constellation rearrangement, each group of data is mapped to a physical channel of a carrier allocated thereto for sending, wherein N is equal to the number of carriers which have been used for packet data transmission of the user equipment.

In the above disclosed method, the traffic transmission channel coding scheme shown in FIG. 2 is employed to implement multi-carrier HSDPA packet data transmission. For the user equipment, it obtains the coding mode employed by the data sent on the HS-DSCH channel from downlink control information.

Figure 5:
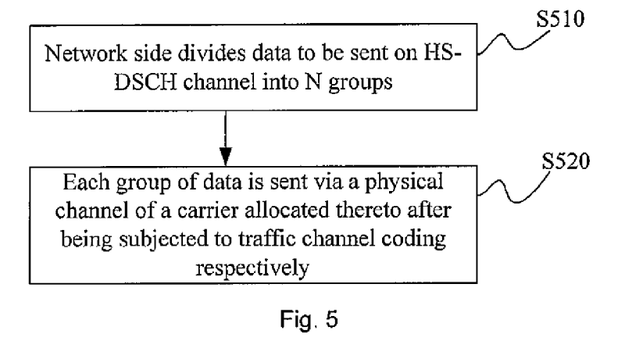
FIG. 5 is a flow chart of the second method for multi-carrier HSDPA traffic transmission channel coding according to another embodiment of the invention.

Referring to FIG. 5, it is a flow chart of the second method for multi-carrier HSDPA traffic transmission channel coding according to another embodiment of the invention, which comprises the following steps:

S510: The network side divides data to be sent on an HS-DSCH channel into N groups, wherein N is equal to the number of carriers which have been used for packet data transmission of a user equipment; and S520: Each group of data is sent via a physical channel of a carrier allocated thereto after traffic channel coding is performed respectively.

In the traffic transmission channel coding process of this method, an HS-DSCH channel is divided into N subchannels. The coding of data on each subchannel is similar to that of single-carrier HSDPA. This method is very simple to implement.

It is assumed that the HS-DSCH channel resources allocated to user A by the network side comprises carrier 1 resource, carrier 2 resource and carrier 3 resource. Then, the network side may divide the data to be sent into three parts averagely in terms of data amount, wherein each part of the data corresponds to a carrier allocated thereto, and the data to be sent is sent to user A via respective carriers. The network side may also determine the amount of data to be sent on each carrier allocated to the user equipment according to the channel condition reported by user A. It is assumed that the channel condition reported by user A is as follows: the channel condition of carrier 1 is the best, the channel condition of carrier 2 is the next best, and the channel condition of carrier 3 is the worst. The network side may pre-allocate the data to be sent to carrier 1. After the resources for HS-DSCH channel in carrier 1 are allocated, the remaining data will be allocated to carrier 2, and after the resources for HS-DSCH channel in carrier 2 are allocated, the finally remaining data to be sent will be allocated to the resources for HS-DSCH channel in carrier 3, so that the data amount sent on each carrier may be determined. The channel condition may consider the number of HS-DSCH channel resources in the carrier. However, the channel condition generally considers the magnitude of HS-DSCH channel interference in the carrier. The smaller the interference is, the better the channel condition of the carrier will be.

However, because a channel quality indication, which comprises the transmission block size of a physical channel of each carrier suggested by the UE, is generally generated when the user equipment reports the channel condition of each carrier to the network side, the network side may divide the data to be sent according to the transmission block size of the physical channel of each carrier.

The traffic channel coding comprises: mapping each group of data to a physical channel of a carrier for sending, after performing CRC attachment, code block segmentation, channel coding, rate matching, scrambling, interleaving and QAM constellation rearrangement. Each step has been described in detail in Method 1, so it will not be described again here.

For the convenience of illustration, it is assumed that the number of the employed carriers is 3, and each carrier is designated as carrier A, B or C respectively. Then, the process for multi-carrier HSDPA traffic transmission channel coding is as follows. The data to be sent via multi-carrier HSDPA is divided into three blocks according to the number of the carriers. In other words, an HS-DSCH channel is divided into three subchannels.

The network side may know the maximum number of carriers supported by a UE according to the capability reported by the UE, and it may determine the number of carriers, time slot and the number of code channels serving the UE at a certain point of time according to the factors such as network load and interference etc. as well as the channel condition of the UE. The network side informs the UE of the control information for sending data at the next point of time via an HS-SCCH. Thus, the UE may exactly know how to receive data.

Figure 6:
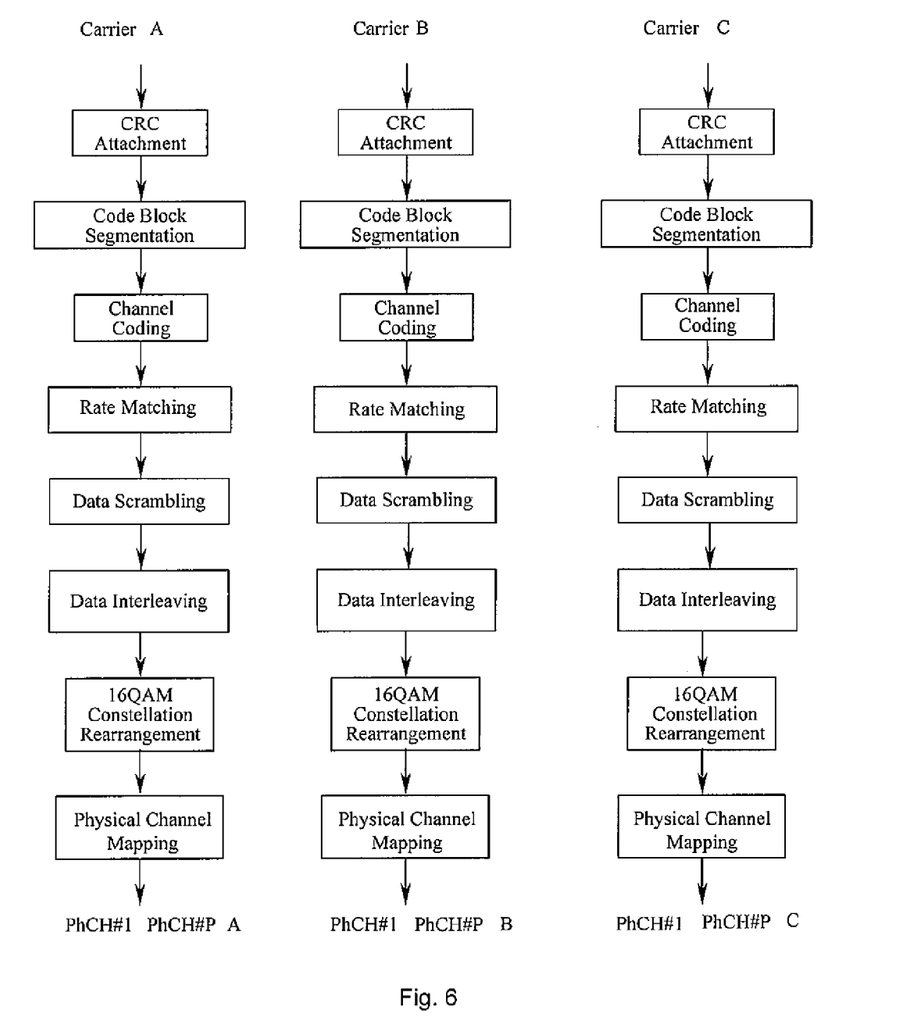
FIG. 6 shows an example of the method in FIG. 5 according to another embodiment of the invention.

The data is transmitted on three carriers respectively. The size of data block on each carrier is determined according to the channel condition of each carrier reported by the UE. In the physical layer, the data is processed on each carrier independently, and will not be combined. In other words, the data on each carrier is transmitted as independent data, and the three groups of data may be regarded as irrelevant during transmission (referring to FIG. 6). The advantage of this method is that it is simple and practical.

An embodiment of the invention provides an apparatus for multi-carrier HSDPA traffic transmission channel coding, which comprises: a data stream dividing unit and N channel coders, wherein N is equal to the number of carriers for packet data transmission, and wherein:

the data stream dividing unit is adapted to divide data to be sent on an HS-DSCH channel into N groups, wherein each group of data is sent to a channel coder;

the channel coders are adapted to send each group of data via a physical channel of a carrier allocated thereto after performing traffic channel coding.

Wherein, each channel coder comprises:

a CRC attachment unit, adapted to attach a CRC check bit to a data block to be sent;

a code block segmentation unit, connected with the CRC attachment unit, and adapted to segment the data block according to its length;

a channel coding unit, connected with the code block segmentation unit, and adapted to perform channel coding on the segmented data block;

a rate matching unit, connected with the channel coding unit, and adapted to perform rate matching twice on the coded data, so as to carry out HARQ transmission;

a data scrambling unit, connected with the rate matching unit, and adapted to scramble the data;

a data interleaving unit, adapted to interleave the scrambled data and send the interleaved data to a QAM constellation rearrangement unit;

a QAM constellation rearrangement unit, adapted to exchange high and low bits of a constellation point for retransmitted data; and a physical channel mapping unit, adapted to map the data to be sent to a physical channel of a carrier allocated thereto for sending.

Based on the above physical channel coding scheme and coding transmission apparatus, the invention provides a corresponding method for multi-carrier HSDPA packet data transmission, which comprises the following steps:

1) The network side receives feedback information, which comprises a channel quality indication, sent by each user equipment via an uplink control channel. At the beginning of the process of establishing packet data transmission between a user equipment and the network side, when the network side sends data to the user equipment for the first time, the network side sends control information via a downlink control channel in advance, and the user equipment receives the control information to control the reception of data on the HS-DSCH channel. During the subsequent packet data transmission, the network side may send the next data according to feedback information of the user equipment via the uplink control channel. Generally, the user equipment may perform channel measurement and send the feedback information such as channel measuring result and so on to the network side via the uplink control channel. The channel quality indication comprises transmission data block size, modulation format and so on suggested by the user equipment.

2) The network side selects the next user equipment to be served and channel resource and transmission format to be employed according to the channel quality indication.

During each data transmission, the network side selects a user equipment to be served and determines the channel resource and transmission format to be employed according to a scheduling algorithm, according to a sent data response message and user equipment channel quality indication fed back by each user equipment via the uplink control channel.

3) The network side sends control information to the user equipment via the downlink control channel, so that the user equipment may receive the data transmitted via the HS-DSCH channel according to the control information. The control information at least comprises a scheme for the network side to encode the data on the HS-DSCH channel.

4) The network side sends the data to be sent via the HS-DSCH channel after performing channel coding. This process comprises the following steps:

A1: The network side divides the data to be sent by the HS-DSCH channel into N groups, wherein N is equal to the number of carriers which have been used for packet data transmission of a user equipment;

A2: After traffic channel coding is performed respectively, each group of data is sent via a physical channel of a carrier allocated thereto. In step 1), the network side determines the amount of each group of data according to the channel condition of each carrier of the user equipment reported by the user equipment.

In the above disclosed method, multi-carrier HSDPA packet data transmission is implemented by employing the traffic transmission channel coding scheme shown in FIG. 5.

Method 3

Figure 7:
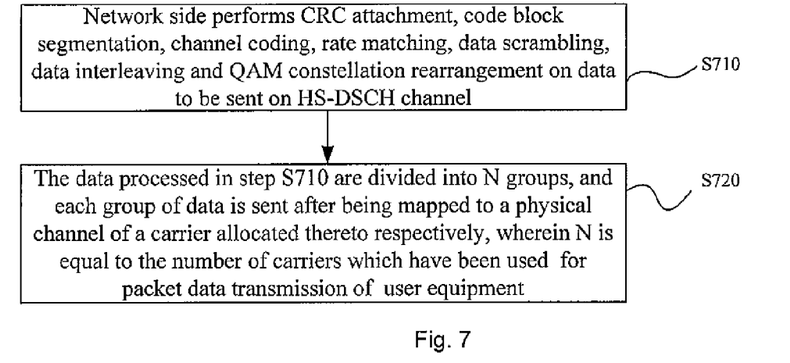
FIG. 7 is a flow chart of the third method for multi-carrier HSDPA traffic transmission channel coding according to the third embodiment of the invention.

Referring to FIG. 7, it shows the third method for multi-carrier HSDPA traffic transmission channel coding according to the invention, which comprises the following steps:

S710: The network side performs CRC attachment, code block segmentation, channel coding, rate matching, data scrambling, data interleaving and QAM constellation rearrangement on data to be sent on an HS-DSCH channel;

S720: The data processed in step S710 are divided into N groups, and each group of data is sent after being mapped to a physical channel of a carrier allocated thereto respectively, wherein N is equal to the number of carriers which have been used for packet data transmission of a user equipment. In step S720, the data block size of a physical channel of each carrier is determined according to a physical channel resource of each carrier, so as to divide the data processed in step S710. The transmission channel coding mode is sent to the user equipment via a downlink control channel.

Figure 8:
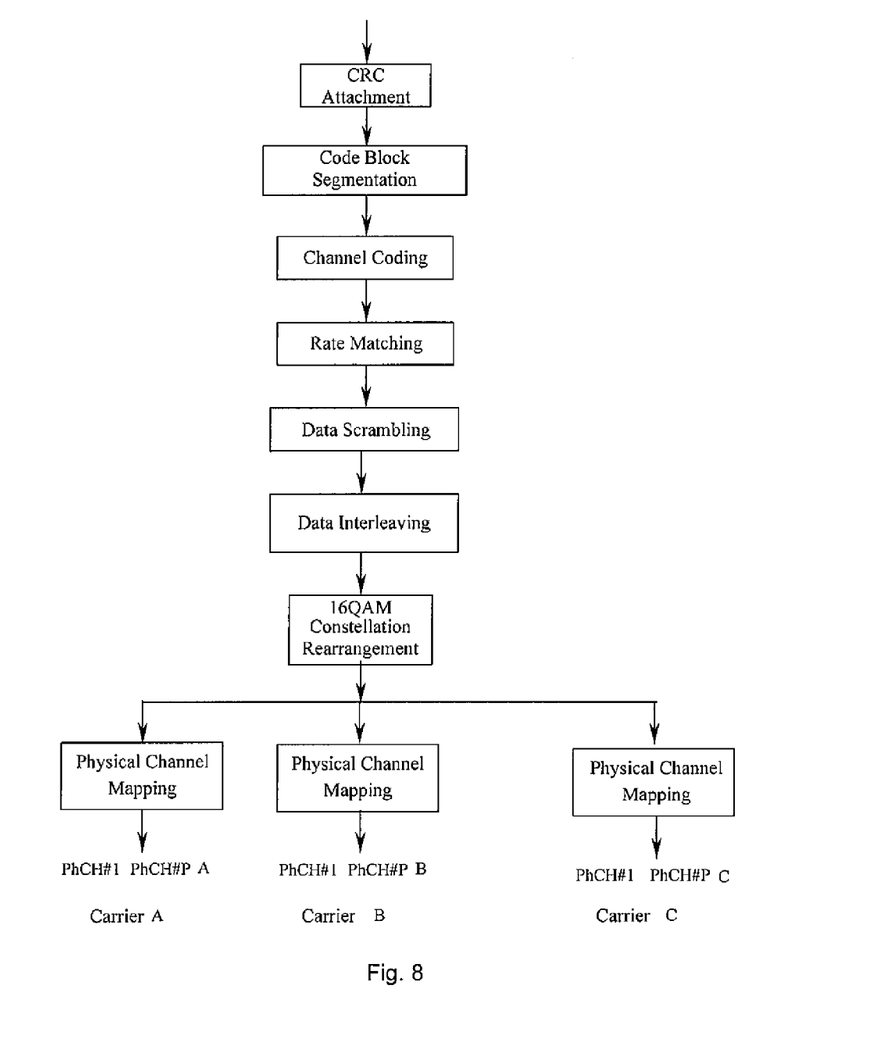
FIG. 8 shows an example of the method in FIG. 7 according to the third embodiment of the invention.

In Method 3, three carrier channels are treated as a whole. The MAC layer will no longer divide the data block to be sent according to the carrier channel condition, instead, it sends the data block as a whole to the physical layer for processing. The physical layer processes the data unitedly, from a CRC attachment module to a constellation re-arrangement for 16 QAM module (QAM constellation rearrangement module). For the data output from the constellation re-arrangement for 16 QAM module (QAM constellation rearrangement module), a data block of the corresponding size will be sent to a physical channel mapping module of each carrier respectively for channel mapping according to the condition of a physical channel resource of each carrier, and then will be transmitted (referring to FIG. 8). The downlink physical channel resource refers to a channel resource allocated by Node B for sending data to a UE. The so-called channel mapping refers to mapping data to be sent to a specific transmitting physical resource for transmission after performing coding and modulation etc.

An apparatus for multi-carrier HSDPA traffic transmission channel coding, comprising: a CRC attachment unit, a code block segmentation unit, a channel coding unit, a rate matching unit, a scrambling unit, an interleaving unit, a QAM constellation rearrangement unit and N physical layer mapping units, wherein N is equal to the number of carriers for packet data transmission, and wherein:

the CRC attachment unit is adapted to attach a CRC check bit to a data block to be sent;

the code block segmentation unit is connected with the CRC attachment unit, and adapted to segment the data block according to its length;

the channel coding unit is connected with the code block segmentation unit, and adapted to perform channel coding on the segmented data block;

the rate matching unit is connected with the channel coding unit, and adapted to perform rate matching twice on the coded data, so as to carry out HARQ transmission;

the data scrambling unit is connected with the rate matching unit, and adapted to scramble the data;

the data interleaving unit is adapted to interleave the scrambled data and send the interleaved data to a QAM constellation rearrangement unit;

the QAM constellation rearrangement unit is adapted to exchange high and low bits of a constellation point for retransmitted data, and divide the data subjected to the QAM constellation rearrangement into N groups, wherein each group of data is sent to a respective physical channel mapping unit; and the physical channel mapping units are adapted to map the data to be sent to a physical channel of a carrier allocated thereto for sending.

The invention further provides a corresponding method for multi-carrier HSDPA packet data transmission, which comprises the following steps:

1) The network side receives feedback information, which comprises a channel quality indication, sent by each user equipment via an uplink control channel;

2) The network side selects the next user equipment to be served and the channel resource and transmission format to be employed according to the channel quality indication;

3) The network side sends control information to the user equipment via the downlink control channel, so that the user equipment may receive the data transmitted via the HS-DSCH channel according to the control information;

4) The network side sends the data to be sent via the HS-DSCH channel after performing channel coding. This process comprises the following steps:

B1: The network side performs traffic channel coding on the data to be sent on the HS-DSCH channel, such as: CRC attachment, code block segmentation, channel coding, rate matching, data interleaving and QAM constellation rearrangement;

B2: The data processed in step B1 is divided into N groups, and each group of data is sent after being mapped to the corresponding physical channel allocated thereto respectively, wherein N is equal to the number of carriers which have been used for packet data transmission of a user equipment.

What are disclosed above are several particular embodiments of the invention, and the invention is not limited thereto. Any variations conceivable by those skilled in the art should fall within the scope of the invention.

The invention claimed is:

1. A method for multi-carrier HSDPA traffic transmission channel coding, comprising the following steps:
A: dividing, by network side, data to be sent on an HS-DSCH channel into N groups, wherein N is equal to the number of carriers for packet data transmission;
B: performing CRC attachment, code block segmentation, channel coding and rate matching on each group of data;
C: forming a new data stream from the N groups of data processed in step B during data scrambling, and interleaving the data stream; and
D: dividing the interleaved data into N groups, and mapping each group of data to a physical channel of a carrier respectively for sending, after performing QAM constellation rearrangement, wherein N is equal to the number of carriers which have been used for packet data transmission of a user equipment.

2. The method for multi-carrier HSDPA traffic transmission channel coding according to claim 1, further comprising the following steps:
reporting, by the user equipment, a generated channel quality indication, which comprises transmission block size of a physical channel of each carrier suggested by the user equipment, to the network side, when reporting a channel condition of each carrier to the network side; and
dividing, by the network side, the data to be sent according to the transmission block size of the physical channel of each carrier.

3. An apparatus for multi-carrier HSDPA traffic transmission channel coding, comprising: a data stream dividing unit, at least N CRC attachment units, at least N code block segmentation units, at least N channel coding units, at least N rate matching units, a scrambling unit, an interleaving unit, at least N QAM constellation rearrangement units and at least N physical layer mapping units, wherein N is equal to the number of carriers for packet data transmission, wherein:
the data stream dividing unit is adapted to divide data to be sent on an HS-DSCH channel into N groups and send each group of data to a CRC attachment unit respectively;
the CRC attachment units are adapted to attach a CRC check bit to a data block to be sent;
the code block segmentation units are connected with the CRC attachment units, and adapted to segment the data block according to its length;
the channel coding units are connected with the code block segmentation units, and adapted to perform channel coding on the segmented data block;
the rate matching units are connected with the channel coding units, and adapted to perform rate matching twice on the coded data, so as to carry out HARQ transmission;
the data scrambling unit is connected with the N rate matching units, and adapted to form a new data stream from the N groups of data during data scrambling;
the data interleaving unit is adapted to interleave the scrambled data and divide the interleaved data into N groups again, wherein each group of data is sent to a QAM constellation rearrangement unit;
the QAM constellation rearrangement units are adapted to exchange high and low bits of a constellation point for retransmitted data; and
the physical channel mapping units are adapted to map the data to be sent to a physical channel of a carrier for sending.

4. A method for multi-carrier HSDPA traffic transmission channel coding, comprising the following steps:
A: dividing, by network side, data to be sent on an HS-DSCH channel into N groups, wherein N is equal to the number of carriers which have been used for packet data transmission of a user equipment;
B: sending each group of data via a physical channel of a carrier allocated thereto respectively, after performing traffic channel coding, wherein the traffic channel coding comprises: mapping each group of data to a physical channel of a carrier allocated thereto for sending, after performing CRC attachment, code block segmentation, channel coding, rate matching, scrambling, interleaving and QAM constellation rearrangement;
C: reporting, by the user equipment, a generated channel quality indication, which comprises transmission block size of a physical channel of each carrier suggested by the user equipment, to the network side, when reporting a channel condition of each carrier to the network side; and
D: dividing, by the network side, the data to be sent according to the transmission block size of the physical channel of each carrier.

5. An apparatus for multi-carrier HSDPA traffic transmission channel coding, comprising:
a data stream dividing unit and N channel coders, wherein N is equal to the number of carriers for packet data transmission, and wherein:
the data stream dividing unit is adapted to divide the data to be sent on an HS-DSCH channel into N groups, wherein each group of data is sent to a channel coder;
the channel coders are adapted to send each group of data via a physical channel of a carrier allocated thereto after performing traffic channel coding, wherein the channel coder comprises:
- a CRC attachment unit, adapted to attach a CRC check bit to a data block to be sent;
- a code block segmentation unit, connected with the CRC attachment unit, and adapted to segment the data block according to its length;
- a channel coding unit, connected with the code block segmentation unit, and adapted to perform channel coding on the segmented data block;
- a rate matching unit, connected with the channel coding unit, and adapted to perform rate matching twice on the coded data, so as to carry out HARQ transmission;
- a data scrambling unit, connected with the rate matching unit, and adapted to scramble the data;
- a data interleaving unit, adapted to interleave the scrambled data and send the interleaved data to a QAM constellation rearrangement unit;
- a QAM constellation rearrangement unit, adapted to exchange high and low bits of a constellation point for retransmitted data; and
- a physical channel mapping unit, adapted to map the data to be sent to a physical channel of a carrier for sending.

6. A method for multi-carrier HSDPA traffic transmission channel coding, comprising the following steps:
   A: performing, by the network side, CRC attachment, code block segmentation, channel coding, rate matching, data scrambling, data interleaving and QAM constellation rearrangement on data to be sent on an HS-DSCH channel;
   B: dividing the data processed in step A into N groups, and sending each group of data after mapping it to a physical channel of a carrier allocated thereto respectively, wherein N is equal to the number of carriers which have been used for packet data transmission of a user equipment. C: reporting, by the user equipment, a generated channel quality indication, which comprises transmission block size of a physical channel of each carrier suggested by the user equipment, to the network side, when reporting a channel condition of each carrier to the network side; and
   D: dividing, by the network side, the data to be sent according to the transmission block size of the physical channel of each carrier.

7. The method for multi-carrier HSDPA traffic transmission channel coding according to claim 6, wherein, in step B, transmission data block size of the physical channel of the carrier is determined according to a physical channel resource of each carrier.

8. An apparatus for multi-carrier HSDPA traffic transmission channel coding, comprising: a CRC attachment unit, a code block segmentation unit, a channel coding unit, a rate matching unit, a scrambling unit, an interleaving unit, a QAM constellation rearrangement unit and N physical layer mapping units, wherein N is equal to the number of carriers for packet data transmission, and wherein:
- the CRC attachment unit is adapted to attach a CRC check bit to a data block to be sent;
- the code block segmentation unit is connected with the CRC attachment unit, and adapted to segment the data block according to its length;
- the channel coding unit is connected with the code block segmentation unit, and adapted to perform channel coding on the segmented data block;
- the rate matching unit is connected with the channel coding unit, and adapted to perform rate matching twice on the coded data, so as to carry out HARQ transmission;
- the data scrambling unit is connected with the rate matching unit, and adapted to scramble the data;
- the data interleaving unit is adapted to interleave the scrambled data and send the interleaved data to a QAM constellation rearrangement unit;
- the QAM constellation rearrangement unit is adapted to exchange high and low bits of a constellation point for retransmitted data, and divide the data subjected to QAM constellation rearrangement into N groups, wherein each group of data is sent to a physical channel mapping unit; and
- the physical channel mapping units are adapted to map the data to be sent to a physical channel of a carrier allocated thereto for sending.

* * * * *